Nov. 6, 1962    J. E. RIJNSDORP    3,062,271
PNEUMATIC ADDITION OF FLOW SIGNALS
Filed March 28, 1961    3 Sheets-Sheet 1

INVENTOR:
JOHANNES E. RIJNSDORP
BY: Oswald Id. Milmore
HIS ATTORNEY

Nov. 6, 1962 J. E. RIJNSDORP 3,062,271
PNEUMATIC ADDITION OF FLOW SIGNALS
Filed March 28, 1961 3 Sheets-Sheet 2

INVENTOR:
JOHANNES E. RIJNSDORP
BY: *Oswald T. J. Milmore*
HIS ATTORNEY

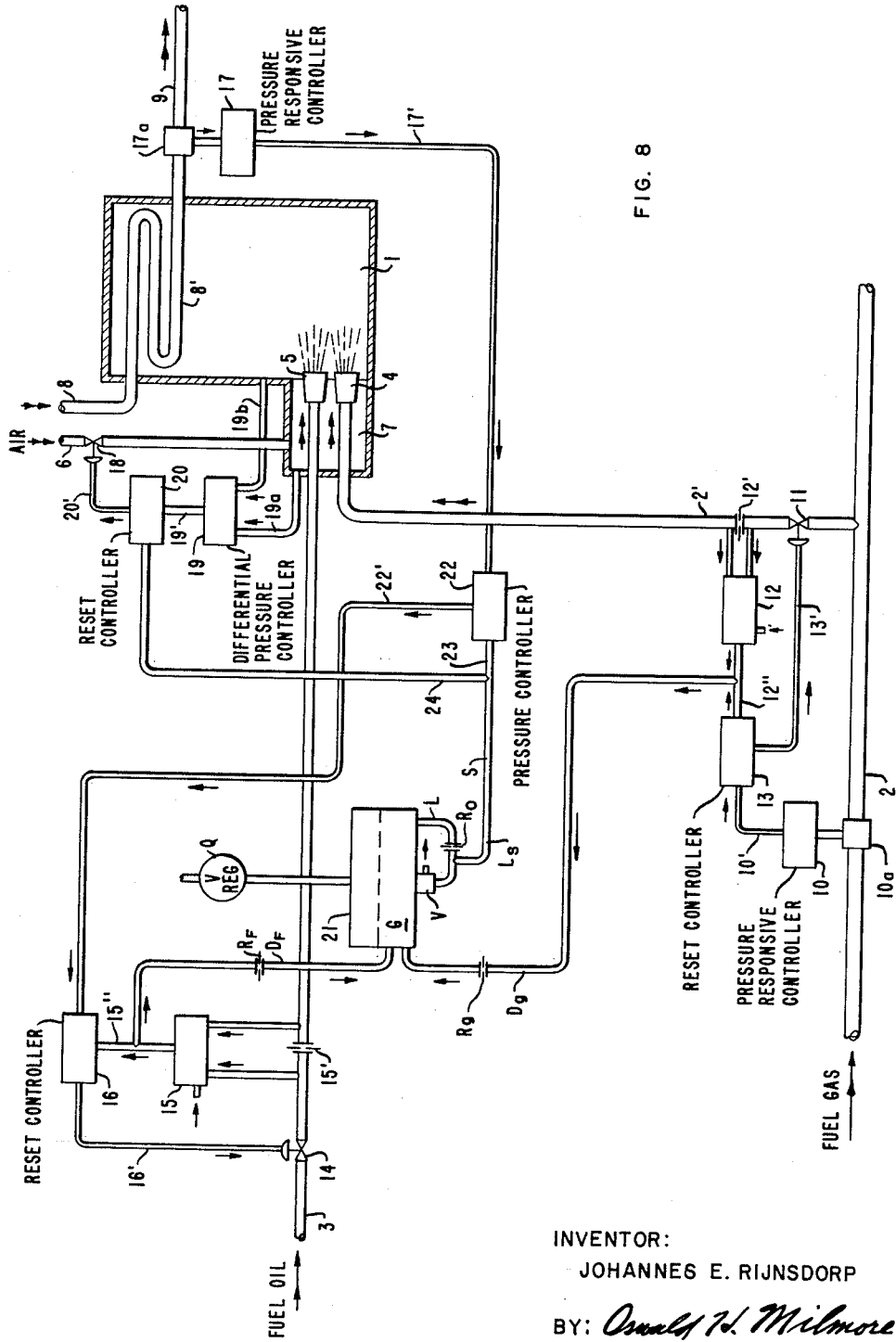

United States Patent Office 3,062,271
Patented Nov. 6, 1962

3,062,271
PNEUMATIC ADDITION OF FLOW SIGNALS
Johannes E. Rijnsdorp, Amsterdam, Netherlands, assignor to Shell Oil Company, New York, N.Y., a corporation of Delaware
Filed Mar. 28, 1961, Ser. No. 98,937
Claims priority, application Netherlands July 24, 1959
16 Claims. (Cl. 158—11)

This is a continuation-in-part of our application Serial No. 35,511, filed June 13, 1960, now abandoned.

The invention relates to a method and an apparatus for the summing of two or more (additive) entities, usually physical or chemical entities measured in a technical installation or in the performance of a process, and to a process and an apparatus for keeping constant the sum of these entities. In particular cases it may happen that a mutually different sign may be assigned to the entities which are to be summed, as might be the case, for instance, in summing flow rates; in such cases the sign may be taken into consideration when summing.

Summing of entities occurs in technology, for example, when it is desired to determine the sum of the amounts of fluids, such as gases and/or liquids, transported through a number of lines (either in total for a given time, or per unit of time). Often the interest does not chiefly lie in the sum of the amounts per se, but in the sum of the masses transported or in the sum of the amounts transported insofar as these relate to a given component occurring in the fluids, or in the summation of a given property (e.g., combustion value) of the fluids. In the latter cases what is actually desired is to determine the weighted sum of a number of entities. Hence the summing of entities includes the weighted summing of such entities.

Other examples of cases in which it may be necessary to sum entities are the determination of an average (a weighted average as the case may be) from a number of measured or given entities, e.g., the determination of an average pressure, an average temperature or an average concentration.

In practice the sum obtained will sometimes only be read off visually from a dial or other indicator or be automatically recorded. Very often, however, it will be desired to control an installation or influence a process by making use of the summing result; in this case the output signal, which is representative of this result, is thus used as control signal, without the result of the summing necessarily being anywhere indicated or recorded.

The invention relates more particularly to a case in which the value of each of these entities is given in the form of a pneumatic pressure signal, viz., in which the magnitude of the entity in question is shown by the value of the pressure of any desired gas (usually air). In this connection it often happens that the signal is not a linear reproduction of the entity but that there is a square or substantially square (i.e., quadratic) relationship between the value of the entity (F) and the magnitude $x$ of the pneumatic signal:

$$x = a + bF^2 \quad (1)$$

(in which $a$ and $b$ represent constants).

This case particularly occurs when the flow rates of fluids conveyed through lines are measured by means of orifice plates and a differential pressure controller is converted to produce a signal having a pressure $x$ which varies linearly with the pressure drop across the orifice.

If in such a case it is desired to determine the sum of a number of entities F it is not possible for this purpose to add the corresponding values of $x$ of the signals. In practice each of these signals has hitherto been led to an instrument capable of extracting the square root mechanically; the transformed output signals produced by these various instruments can then be added in some manner. This method of operation is, however, expensive and complicated.

The objects of the present invention are to provide a simple method by which the desired sum of the entities represented by quadratically related pressure signals can be determined in a reliable and accurate manner and which sum can, if desired or necessary, be converted into a pneumatic output signal; and also to provide cheap equipment for carrying out the present method in practice.

According to the invention each source of pneumatic signal pressures is connected to a common vessel defining a space of constant or practically constant pressure via a duct having a square or substantially square resistance characteristic and the rate of efflux of gas from the space is measured, thereby obtaining an output which is a function of the sum, i.e., linearly or quadratically related to said sum.

In order to maintain a constant pressure in this space a quantity of gas equal to the total amount of gas supplied to the common space by the signal sources per unit of time should also be withdrawn from this space. The rate of discharge of this quantity of gas from the common space is, therefore, equal to the sum of the entering streams. Because these enter the space at rates that are related linearly to the entities in question, the said discharge rate is linearly related to the sum of the said represented entities.

The signal sources per se are not parts of the invention and may take the form of any known or suitable devices which produce pneumatic signals which are related quadratically to the entities to be added. The example of a differential pressure controller which produces a pressure signal related linearly to the pressure drop across an orifice plate in a pipe to measure liquid or gaseous flow therein was mentioned above. When the entities are pressures or temperatures, represented by mechanical, pneumatic or electrical primary signals, such primary signals are converted by known or suitable devices into similar pneumatic signals.

The invention further includes the case wherein one or more of the added entities is (are) represented by one or several pneumatic signals having a linear relation to the entity represented thereby. In this case such linearly related pneumatic signal is also led into the common space but the element having the square resistance characteristic is omitted from the duct.

The summation output signal which represents the sum of the entities may be any function of the sum, e.g., may be linearly or quadratically related to the sum; it may be the form of a visual indication on a scale or dial, or an electrical, mechanical or pneumatic signal. In one embodiment of the invention this output signal is obtained by withdrawing the gas from the common space via a discharge duct which is provided with a control valve, the valve being operated by a controller which is responsive to the pressure within the space so as to maintain the space at a constant pressure. The position of the valve is then a measure of the rate of efflux from the space and, hence, of the sum of the entities.

It is most commonly desired to produce a summation output signal in the form of a pneumatic pressure signal. In a preferred embodiment of the invention, wherein the gas is discharged through a valve controlled by a controller to maintain a constant pressure, as mentioned in the preceding paragraph, the discharge duct contains a constant (fixed or adjustable, as desired) resistance element for the gas flow (e.g., a flange with a small opening, a capillary tube or the like) between the said space and the control valve. The pressure in the discharge duct between the resistance element and the control valve then constitutes the desired pneumatic pressure signal. The discharge duct usually opens out into the atmosphere, but may be connected to a receiver held at a constant pressure.

The invention will now be elucidated in greater detail with reference to the accompanying drawings forming a part of this specification and showing, by way of example and diagrammatically, certain preferred embodiments, wherein:

FIGURE 8 is a schematic view of a control system for a furnace employing the invention to regulate the flow of fuel oil in accordance with fluctuations in the supply of fuel gas.

Figure 1:
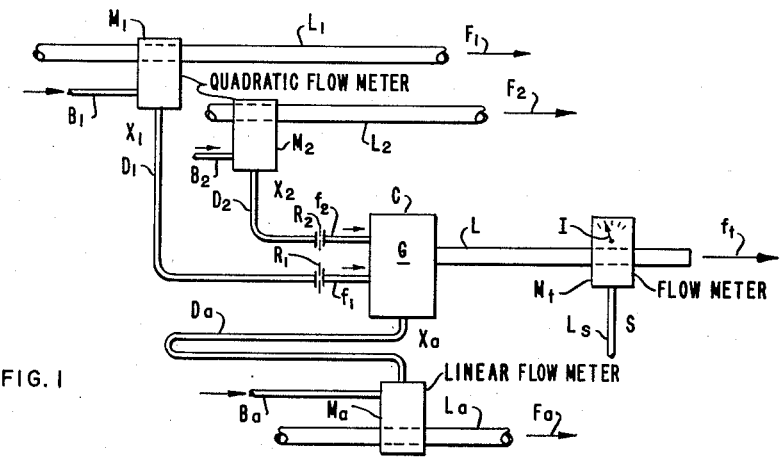
FIGURE 1 is a diagram of one embodiment wherein the common space is operated at atmospheric pressure.

Referring to FIGURE 1, the apparatus is suitable for summing a number of entities $F_1$, $F_2$, etc. For purposes of the instant example it is assumed that these entities represent liquid flow rates, i.e., amounts of liquids flowing through a number of lines $L_1$, $L_2$, etc. per unit of time. For the sake of simplicity only two such lines $L_1$ and $L_2$ are shown in the drawing; the line $L_a$ will be described hereafter and is not involved in this part of the disclosure.

Figure 2:
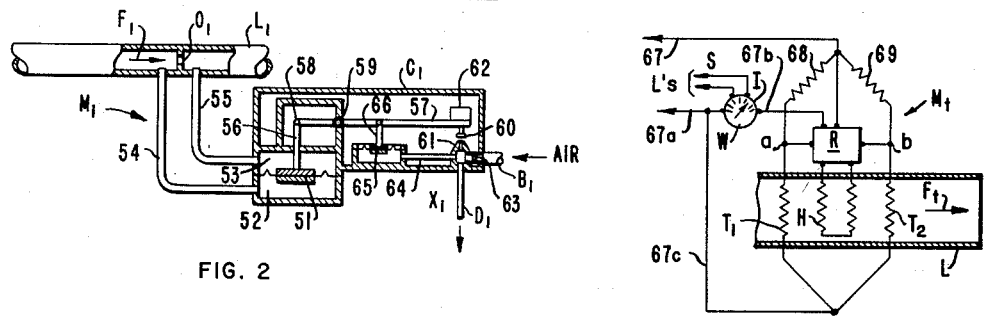
FIGURE 2 is a diagrammatic view of a specific embodiment of the meter $M_1$.

A measuring instrument $M_1$ measures the value of $F_1$, for example, by determining the difference in pressure over an orifice plate in the line $L_1$ as is shown in FIGURE 2, although this type of meter is not restrictive of the invention. Instrument air under constant pressure is admitted from a source, not shown, to the meter at $B_1$. The measuring instrument $M_1$ produces in a duct $D_1$ an output signal $x_1$ in the form of a pneumatic pressure signal, in which the following relationship holds good for a comparatively large measurement range:

$$x_1 = a_1 + b_1 F_1^2 \qquad (2)$$

($a_1$ and $b_1$ are constants).

In the system illustrated in FIGURE 2, the quadratic meter $M_1$ includes an orifice plate $O_1$ in the line $L_1$ and a differential pressure controller $C_1$. The latter has a movable diaphragm 51 dividing a closed chamber into lower and upper compartments 52 and 53 which are respectively connected by tubes 54 and 55 to the upstream and downside sides of the orifice plate $O_1$. The diaphragm is attached to a push rod 56 which in turn is pivoted to a beam 57 by a pivot 58. The beam rotates about a fulcrum 59, whereat it is sealed to the closed chamber. At the end of the beam opposite the pivot 58 is a throttle tip 60 which cooperates with a bleed orifice 61 to regulate the flow of air therethrough, instrument air being admitted through the tube $B_1$ at constant pressure. The tube $B_1$ is connected to the orifice 61 and the output duct $D_1$ and contains a flow restrictive element 63, such as a restriction, at a point close to its connection to the orifice and duct $D_1$. A branch tube 64 connects the end of the duct $D_1$ with the closed space beneath a movable diaphragm 65 as shown; this diaphragm is connected with the beam by a rod 66, as shown. The signal pressure $x_1$ in the duct $D_1$ acts on the diaphragm 65 to balance the difference between the pressures acting on the diaphragm 51, so that $x_1$ varies linearly with the differential pressure across the orifice $O_1$ which, in turn, is a square function of $F_1$, as given by Equation 1. Such differential pressure controllers are well known and commercially available and a complete description is, therefore, not presented herein. It may be observed, however, that such controllers may be provided with bias means, such as a weight 62, to cause the pressure $x_1$ to have a finite value when the differential pressure is zero, i.e., the constant $a_1$ is not usually zero. This will be further explained hereinafter. The constant $a_1$ is, in this specific example, approximately proportional to the weight 62 and to the ratio of the lever distances from the fulcrum 59 to the weight 62 and to the rod 66, and inversely proportional to the area of the diaphragm 65. Also in this example, the constant $b_1$ is approximately proportional to the ratio of the areas of the diaphragms 51 and 65, to the ratio of the distances from the fulcrum 59 to the pivot 58 and to the rod 66, and to the orifice coefficient of $O_1$. Further, the characteristics of the orifice influence these constants.

The pneumatic pressure signal $x_1$ is transmitted via the duct $D_1$ having a resistance element $R_1$ to a space G defined by a closed vessel C and maintained at constant pressure (in the present instance atmospheric pressure by means of a large discharge duct L). The resistance $R_1$, which may be an orifice in a plate or a narrowed section in the duct, has a square resistance characteristic, the relationship being:

$$x_1 = c_1 + d_1 f_1^2 \qquad (3)$$

The constants $c_1$ and $d_1$ are determined by the characteristics of the resistance $R_1$.

In this relationship $f_1$ is the amount of gas supplied to the space G per unit of time as a result of the pressure $x_1$; $c_1$ and $d_1$ are constants.

From this it follows that $$a_1 + b_1 F_1^2 = c_1 + d_1 f_1^2 \qquad (4)$$

By assigning suitable values to the constants (which means in practice that the resistance $R_1$ and the output level of the pneumatic signal source $M_1$ should be chosen in suitable ways) it is a simple matter to ensure that $$f_1 = k_1 F_1 \qquad (5)$$

wherein $k_1$ is a constant. This can be ensured by selecting components such that $a_1$ is equal to $c_1$; then $k_1$ is the square root of the fraction $b_1/d_1$.

The measuring instrument $M_2$ may likewise be constructed as outlined in connection with FIGURE 2 and similar observations apply in the case of the entity $F_2$, the measuring instrument $M_2$, the resistance $R_2$ in the duct $D_2$ and the gas stream $f_2$ produced (and for any additional entity still to be summed), so that $$f_2 = k_1 F_2 \qquad (6)$$

It follows from the above that the sum $f_t$ of the gas streams $f_1$ and $f_2$ is actually a measure of the sum $F_t$ of the entities $F_1$ and $F_2$.

Because the space G is in direct communication with the atmosphere via a large discharge duct L, the pressure in the space is very approximately equal to (i.e., only slightly above) the pressure of the atmosphere, which latter pressure may be regarded as sufficiently constant. When G is at atmospheric pressure the meters $M_1$, $M_2$, should be adjusted to make $x_1$, $x_2$, etc. substantially atmospheric for zero values of the entities. By measuring the value of $f_t$ by means of a flow-measuring instrument $M_t$ having a suitable scale or indicator I the required sum $F_t$ is determined. The measuring instrument $M_t$ may, for example, be a heat-conductivity or a heat-addition meter of known or suitable construction; such an instrument introduces practically no resistance to the flow of gas through the duct L.

Figure 3:
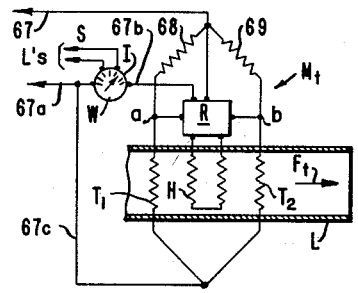
FIGURE 3 is a diagrammatic view of a specific embodiment of the meter $M_t$.

An embodiment of a heat-addition meter is shown diagrammatically in FIGURE 3. It includes an electrical resistance heating element H mounted within the line L to impart heat to the air flowing through it and is supplied with electrical power at a rate controlled by a regulator R, which is connected to both sides of a source of direct or alternating current potential via a meter W and circuits 67, 67a, and 67b. The meter W may be a wattmeter and, if the electrical potential is constant, an ammeter. It has a dial I by which the power input to the heating element is measured. Spaced upstream and downstream from the heating element and also within the line L are resistance thermometers $T_1$ and $T_2$ which are connected electrically in a bridge network which includes resistors 68 and 69. The junction between these resistors is connected to the power circuit 67 and the junction between resistance thermometers to the power circuit 67a via a circuit 67c. The other two bridge junctions $a$ and $b$ are connected to the regulator R as shown. When an unbalance between the junctions $a$ and $b$ occurs it is impressed upon the regulator to vary the power input to the heating element H.

The regulator operates to maintain a constant temperature difference between the thermometers $T_1$ and $T_2$, usually of the order of one or a few degrees F. The temperature difference between these thermometers is inversely proportional to the air flow rate, assuming a constant specific heat. In maintaining the temperature difference constant the regulator varies the electrical power to the heating element and, hence, the indication on the dial I, in proportion to the air flow.

The result of the summation, i.e., the output of the meter $M_t$ which is the value of $f_t$ (and, hence, represents $F_t$), may be read off the dial I and recorded. However, often this result will be used directly or indirectly in a process or technical installation as a control signal. In such a case the instrument $M_t$ is designed to transmit a signal S through a suitable signal line $L_s$ in electrical, mechanical or pneumatic form. For example, the meter W may be equipped with a signal transmitter of known or suitable design for generating an electrical voltage signal which is transmitted via electrical circuits $L'_s$. In the case of FIGURE 1 the signal line $L_s$ is represented as a duct for carrying a pressure signal. The output signal may vary linearly or as a power, e.g., as the square of the measured sum $f_t$.

The summation outlined need not be confined to the summation of two entities, but as stated earlier, may be extended to any desired number of entities. Moreover, the apparatus may also produce a weighted sum of the various entities since it is possible to assign different values to the above-mentioned constants $k$ (by a suitable adjustment of the measuring instruments $M_1$, $M_2$, etc., and of the resistances $R_1$, $R_2$, etc.) in the several branches which feed to the space G so that:

$$f_1 = k_1 F_1;\ f_2 = k_2 F_2 \text{ etc.} \qquad (7)$$

The sum $f_t$ then becomes:

$$f_t = k_1 F_1 + k_2 F_2 + \ldots + k_n F_n = \sum_{1 \ldots n}^{i} k_i F_i \qquad (8)$$

It may be important to determine a weighted sum when, for example, it is not desired to known the sum of the volumes transported, but the sum of the masses transported through the lines $L_1$ and $L_2$, etc., and the densities of the separate streams are different but are at least substantially constant. Sometimes it is desired to know the total combustion value of the various streams (as when fuels are transported through the lines $L_1$, $L_2$, etc.). In this case each stream is weighted with the specific combustion value of the relevant fuel by a choice of the $k$-values in Equations 7 and 8.

It sometimes happens that it is desired to add to the above-mentioned entities, which are given by signals having square relationships to the entities, one or more other entities of which the values are given in the form of such pneumatic pressure signals that there is a linear or a substantially linear relationship between the entity and the corresponding signal pressure. In this case each source or sources of such latter signal pressure(s) may also be made to supply a gas stream to the common space of constant or practically constant pressure, but in this instance the latter gas streams flow through ducts which have linear or substantially linear resistance characteristics.

This is shown in FIGURE 1, wherein $M_a$ is a measuring instrument which measures the value of an entity $F_a$ in a line $L_a$, to which instrument air is admitted at $B_a$, and which produces an output signal $x_a$ in the form of a pneumatic pressure signal which is linearly proportional to $F_a$. This signal is transmitted via a duct $D_a$ to the space G. The duct $D_a$ differs from the ducts $D_1$, $D_2$, etc., in that linear flow characteristics occur, that is, the flow is constantly at a low Reynolds number. Because the pressure drop per unit length of duct may be low under such conditions it may be desirable to use a long duct. The flow $f_a$ through the duct $D_a$ is, therefore, approximately proportional to the signal pressure. Hence the total flow $f_t$ measured by the measuring instrument $M_t$ is proportional to the summation of $F_1$, $F_2$ and $F_a$.

Figure 4:
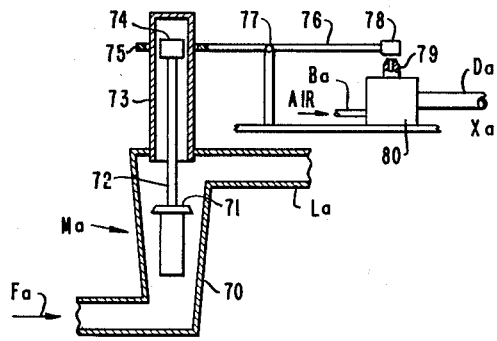
FIGURE 4 is a diagrammatic view of a specific embodiment of the meter $M_a$.

The meter $M_a$ may, for example, include a rotameter and a pneumatic pressure transmitter, as is shown diagrammatically in FIGURE 4. It includes an upwardly divergent chamber 70 containing a float 71, the vertical position of which is determined by the rate of flow through the line $L_a$. The float carries a rod 72 extending upwards into a closed chamber 73 and carrying a magnet 74. The position of the magnet is sensed by a magnetically responsive yoke 75 which is fixed to the end of a beam 76 having a fulcrum at 77. The beam carries at the end opposite to the yoke a throttle tip 78 which cooperates with a bleed orifice 79 of a pressure controller 80. Instrument air is admitted at constant pressure to the controller at $B_a$ and air at a pressure $x_a$, linearly related to the flow $F_a$, is discharged via the output duct $D_a$.

It is evident that, because the instrument $M_a$ and duct $D_a$ feed gas into the space G at a rate which is proportional to the entity $F_a$, the system is also applicable in cases where the instrument $M_a$ induces such proportional rate of flow regardless of small variations in back-pressure, e.g., as when it includes a positive-displacement or diaphragm pump which operates at a rate proportional to $F_a$, e.g., said pump is mechanically connected to be driven with the pump causing the flow $F_a$. In such an instance it is, of course, immaterial whether the duct $D_a$ is free from restrictions which lead to a square resistance characteristic.

The procedure is similar when it is only necessary to sum one entity of the former category (showing a square relationship between magnitude and signal pressure) and one or more entities of the latter category (linear relationship). In practice these cases may occur, for example, when meters with orifice plates are used along with volumetric flowmeters in measuring flow rates.

Figure 5:
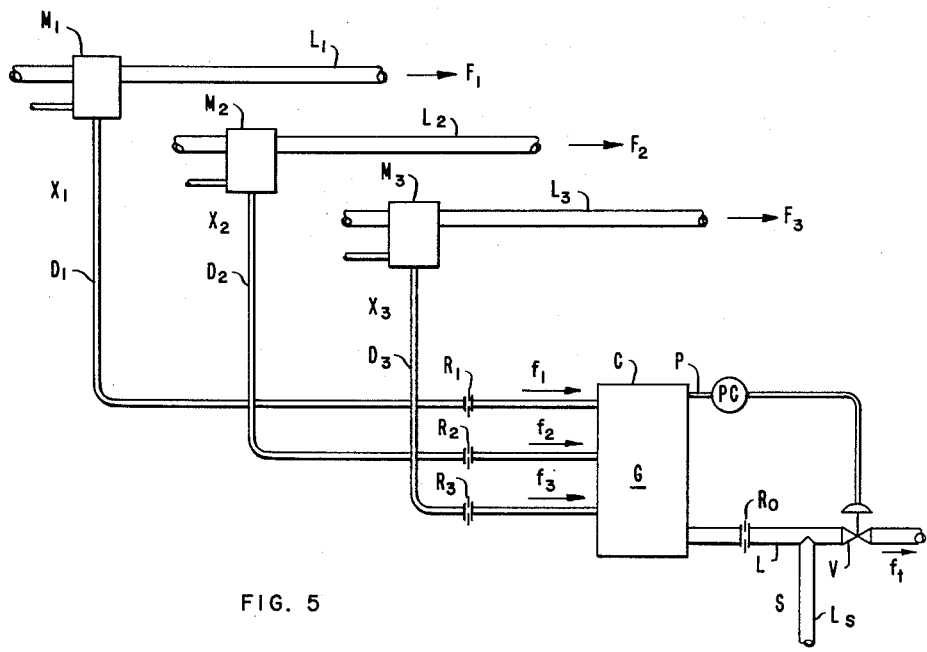
FIGURE 5 is a diagram of a second embodiment wherein the common space has a valve-controlled discharge duct.

FIGURE 5 shows schematically an apparatus giving a pneumatic pressure signal as the output signal, which pressure signal is representative of the sum of three entities $F_1$, $F_2$ and $F_3$. The scheme corresponds with the scheme shown in FIGURE 1 (with the exception that three lines $L_1$, $L_2$, $L_3$ for the entities $F_1$, $F_2$ and $F_3$ and their associated measurement instruments $M_1$, $M_2$, $M_3$ and ducts $D_1$, $D_2$, $D_3$ are shown, and that the linearly proportional signal source is not shown) and differs only in that the measurement of $f_t$ and the control of the pressure in the space G are altered. Discharge duct L now successively contains a resistance element $R_o$ and a control valve V. An output signal duct $L_s$ is connected to the line L between the resistance element and the valve. The pressure in the space G is kept at a pre-adjusted constant level by means of a pressure controlled designated PC which is connected to the space G by a line or duct P by which it receives a signal indicative of the pressure in the said space, and which controls the position of the control valve V. If the pressure of the space G exceeds the value set in the controller PC the valve V is opened further; if the pressure in G is too low the opening of the control valve is reduced. When the pressure in G is constant the sum $f_t$ of the gas streams $f_1+f_2+f_3$ supplied thereto is actually drawn off through the line L.

A pressure drop determined by the magnitude of $f_t$ develops across the resistance element $R_o$. The pressure in the line L between the resistance $R_o$ and the valve V is therefore a measure of the magnitude of $f_t$. Hence the signal S in the duct $L_s$ measures $f_t$ provided, of course, that the size of the gas stream bled off via $L_s$ is small in relation to $f_t$. The resistance $R_o$ may be given a linear or square characteristic, as desired. If a linear characteristic is used (this occurs in a flow under conditions in which the Reynolds number is relatively small, e.g., flow through a smooth-walled duct of uniform diameter at low velocity) the pressure signal S is also linearly dependent on $f_t$; when a square characteristic is used (flow at relatively high Reynolds numbers, e.g., through an orifice or constriction) this pressure signal is quadratically dependent on $f_t$. It is sometimes advisable to choose for $R_o$ a resistance having a square characteristic, for example when the signal S is used in order to affect the set point value of a controller which itself is controlled by a measuring instrument having a square characteristic.

Although the size of the space G is by no means critical it is in fact desirable that this space should not be too large as otherwise the more rapid fluctuations of $f_1$, $f_2$, etc. are not reflected in the pressure signal S.

If one or more entities F have a negative value and if as a result thereof one or more gas streams $f$ should also have a negative value, the operation of the apparatus remains unchanged; the apparatus then, so to speak supplies gas back to the corresponding instruments M. It will be understood that it is also possible (by a suitable choice of the pressure levels) to operate the apparatus in such a way that the streams $f_1$, $f_2$, $f_3$ and $f_t$ run in a direction opposite to that shown in the drawing.

Negative gas flow through the ducts $D_1$, $D_2$, $D_3$ can occur, with some instruments, when one or more of the measured entities has a negative value; it can also be the normal flow direction for positive measurements. The latter may be explained by noting that the instruments usually are devices which receive compressed gas from a common supply system and reduce the pressure thereof at the instrument output in accordance with the input signal. If the said common supply system is maintained below atmospheric pressure, and/or if compressed gas is admitted into the system via the valve V, the supply system becomes a sink for receiving gas; the instruments will then still maintain the pressures $x_1$, $x_2$, $x_3$ at the adjoining termini of the ducts $D_1$, $D_2$, $D_3$, in accordance with the measured values of the entities. Moreover, when the instruments contain their own means for inducing gas flow, such as fans, or are equipped with pneumatic transformers as mentioned below, they can induce flow of gas alternately in the forward or reverse direction. Inasmuch as measuring and pneumatic control instruments are well known and form no part of the invention, details are not included in this specification.

Figure 6:
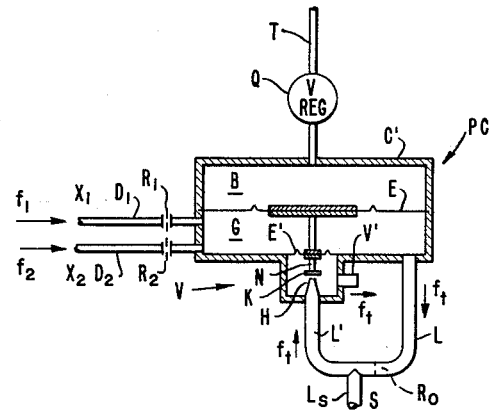
FIGURE 6 is a diagram of a third embodiment wherein the pressure-controller for the valve-controlled discharge duct is combined with the common gas-receiving chamber.

FIGURE 6 shows schematically an apparatus in which the pressure controller PC (see FIGURE 5) and the space G are housed together in a box-shaped structure C'. The box C' is divided into two parts by means of a movable diaphragm E; the bottom part is the common, constant-pressure space G into which the several gas streams from the measuring instruments issue and from which the composite stream $f_t$ is discharged via the discharge duct L. The latter stream then passes successively through a constriction $R_o$, a downstream duct L', and a control valve V which in this case consists of the combination of a jet pipe H having a narrow discharge opening and a small movable throttle plate K. The throttle plate is connected to the diaphragm E by means of a rod N. A very flexible membrane E' is used to conduct the rod N through the bottom wall of the space G; the dimensions of this membrane are small compared to those of the diaphragm E. The gas is vented from the valve at V'.

A constant back-pressure is maintained in the space B above the diaphragm E, in the present case by means of compressed air which is supplied from a source at regulated pressure (not shown) and, if desired, drawn off via a duct T having a pressure reducing valve Q; this can, however, also be effected by means of an adjustable spring tension or a combination of air and spring pressure. The apparatus shown now automatically ensures that a constant pressure prevails in G as well, since if the pressure in G were to exceed the equilibrium back-pressure in the space B to which the apparatus is set, the diaphragm E would move upwards, as would also the throttle plate K, so that the resistance of the control valve is decreased. Consequently the stream $f_t$ increases and the pressure in G decreases until the equilibrium has been reached. The reverse occurs when the pressure in G falls below the equilibrium pressure.

The gas stream $f_t$ can flow freely to the atmosphere from the housing at the outlet V'. Between $R_o$ and H is a branch duct $L_s$ from which can be derived as a pneumatic pressure signal S which is representative of the sum of the entities. It is evident the gas flow through the duct $L_s$ should be kept small, so that some gas always flows through the valve V.

The instruments $M_1$, $M_2$, etc., by which the magnitudes of the entities are measured are often incapable in themselves of generating a pneumatic pressure signal capable of producing the desired flow of gas without a decrease in the magnitude of the pressure signal. Thus, differential pressure controllers of the type indicated in FIGURE 2 are often designed to work in conjunction with a receiving instrument which includes a pressure-responsive diaphragm or the like which consumes no gas or wherein at most only a small bleed stream of gas flows. When a sizable gas stream is taken off from such instruments the pressure at the instrument output falls to below the desired value. This difficulty may be avoided by providing a pneumatic transformer—also known as an amplifier or pneumatic relay or transmitter—for each instrument.

Figure 7:
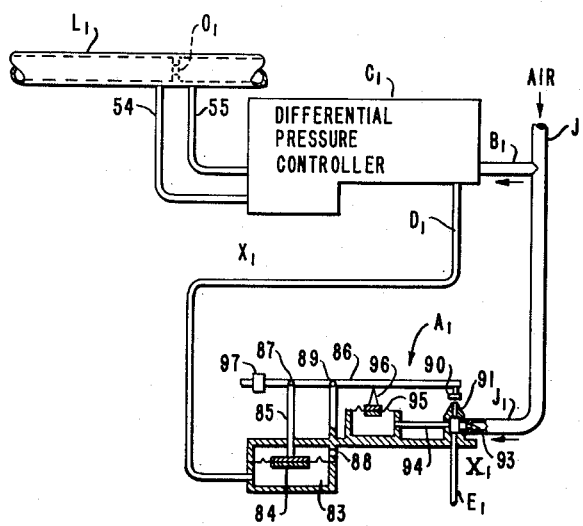
FIGURE 7 is a fragmentary diagram showing a pneumatic amplifier.

Such a pneumatic transformer relay or amplifier is shown in FIGURE 7, wherein the source measuring instrument includes an orifice plate $O_1$ in the line $L_1$ and a differential pressure controller $C_1$ connected to the line by tubes 54 and 55, as described for FIGURE 2. Instrument air to the controller is supplied via the duct $B_1$ from a compressed air line J. The pneumatic output duct $D_1$ is connected to an amplifier $A_1$, specifically, to a closed chamber 83 having a movable diaphragm 84 which is connected to a push rod 85 which in turn is pivoted to a beam 86 by a pivot 87. The space above the diaphragm is vented to the atmosphere by a port 88. The beam rotates about a fulcrum 89, and carried at the end thereof remote from the pivot 87 a throttle tip 90 which cooperates with a bleed orifice 91 to regulate the flow of air therethrough. Instrument air at constant pressure is admitted from the air line J via a branch duct $J_1$. The duct $J_1$ is connected ot the orifice 91 and to the output duct $E_1$ and contains a flow restrictive element 93, such as a restriction, at a point close to its connection to the orifice and duct $E_1$. A branch tube 94 connects the end of the duct $E_1$ with the closed space beneath a movable diaphragm 95 as shown; this diaphragm is connected to the beam by a push rod 96, as shown. The amplified signal pressure $X_1$ in the duct $E_1$ acts on the diaphragm 95 to balance the force acting on the diaphragm 84, it being understood that the beam 86 is suitably balanced as desired to cause the pressure $X_1$ to be zero or to have a finite value when the pressure $x_1$ is zero. This pressure relation will be described hereinafter. An adjustable weight 97 permits balancing.

The amplifier $A_1$ is adapted to handle larger gas flows and to maintain at the outlet a pressure the changes in which are equal to or proportional to the changes in the pressure signal $x_1$ from the differential pressure controller. It will be understood that such a relay or amplifier would be applied to each of the instruments $M_1$, $M_2$, etc. A further advantage of the insertion of such a pneumatic transformer is that the pressure level corresponding to the zero value of the measuring instrument and the pressure range corresponding to the measuring range of the instrument can be adjusted or selected comparatively independently of the pneumatic zero level and the signal range of the measuring instrument itself. Whenever reference is made to a measuring instrument ($M_1$, $M_2$, etc.) it is assumed that such a transformer is present (if required).

Should no pneumatic amplifiers or relays be used after the measuring instruments the various pressures and pressure ranges may be effectively set as follows when the schemes according to FIGURES 5 or 6 are used. It is assumed that all instruments are capable of operating only through a range of 3–15 units of pressure; the magnitude of the units will be discussed below. The instruments are so set, e.g., by adjusting the weights 62 (FIGURE 2), that the pneumatic pressure signals $x_1$, $x_2$, etc. of the instruments $M_1$, $M_2$, etc., reach the value of 9 units (selected midway between 3 and 15) when the instruments show the value zero of the entities which are to be measured, e.g., $F_1$, $F_2$, etc.; the maximum pressure signal at full deflection or maximum reading of each instrument is 15 units, and the constant pressure of the space G is 9 units. The pressure range of the sum signal at S then lies between 9 (sum=0) and 3 units (sum=maximum). Half of the range is thereby sacrificed.

By way of specific example, assume that the entities $F_1$, $F_2$, etc., vary between zero and 100 and that the constants $k_1$, $k_2$ in Equations 5 and 6 are all assigned the value 0.01. The values of the several constants are then chosen as follows:

$a_1$, $a_2$, etc., and $c_1$, $c_2$, etc., equal to 9.
$b_1$, $b_2$, etc., equal to $6 \times 10^{-2}$.
$d_1$, $d_2$, etc., equal to 6.

From the substitutions in the equations it is evident that for the values 0, 50 and 100 of the entity $F_1$, $x_1$ will assume the values of 9, 10.5 and 15, respectively, and the rates of flow through the duct $D_1$ are 0, 0.5 and 1.0, respectively.

If, however, amplifiers are arranged after the instruments one is far less dependent on the characteristics of the instruments themselves; the pressure levels and the pressure ranges can now be selected comparatively freely and moreover maximum use can be made of the normal ranges of instruments and controllers (3–15 units). In the latter case the output signals $X_1$, $X_2$, etc. of the amplifier may, for example, be in the range of 15 to 27 units, the constant pressure in G at 15 units, and the output signal S between 15 and 3 units.

As most instruments are internationally standardized as regards the pressure range of the pneumatic signal they supply, the above-mentioned values are directly adapted to practical use when 1 lb. per sq. in. is taken as the unit. Usually such instruments operate at pressures between 3 and 15 units gauge (respectively about 17.2 and 29.7 lbs. per sq. in. abs.), lower pressures being not used to facilitate operation at ambient pressures.

The signal S which can be derived from the instruments $L_s$ can be read off on a measuring instrument, recorded, and/or used for control purposes, i.e., used for direct control when a control element is affected directly via the signal S, or indirect control when the signal S affects the set point of a controller.

Application of the invention to a combustion process will be described with reference to FIGURE 8, viz., the firing of a furnace 1 with two different fuels, the signal S being used for controlling supply of fuel. In the drawing, lines with double arrows represent pipes through which media flow; lines with single arrows relate to the control equipment.

The furnace 1 is shown as used for the production of steam from water, although the control system shown may be equally well used in a furnace in which another liquid, for instance oil, is heated and, if desired, evaporated.

The furnace is fired with two fuels, viz., refinery gas and fuel oil, supplied through pipes 2 and 3, respectively. The gas produced by different sources in a refinery is available at an irregular rate and the amounts made available also have to be consumed immediately (usually not only by the furnace 1). The irregular production and the need of immediate consumption is the reason why a considerable amount of the gas has hitherto been burnt off in a flare; by simultaneous consumption of a second fuel, such as fuel oil, which can be supplied on demand at a comparatively unlimited rate, in combination with a control device which constitutes an essential feature of the invention, it is now possible to consume in a useful manner practically all gas available.

To this end the furnace is provided with two (or two sets of) burners 4 (for gas) and 5 (for fuel oil). Compressed combustion air is supplied to an air box 7 through a pipe 6 and flow control valve 18. Water is supplied through a pipe 8 to a furnace coil 8' and steam is discharged through a pipe 9.

The pressure in the main gas-supply pipe 2 is measured by a meter 10, which is also a controller and is connected to a pressure-sensing element 10a. When this pressure increases, which means that more gas is made available, this meter-controller gives a reset control signal, e.g., a pneumatic pressure signal, in a manner discussed below, to the various consumers of the gas (including the furnace 1 which is connected to the main gas pipe 2 via the branch pipe 2'). The said control signal is an order to consume more gas. The control system should now ensure that less oil is supplied to the burner 5 as more gas is burned in the furnace.

In principle, it would appear that this control could be effected by allowing the result of the process, which is expressed, for example, in the pressure of the steam produced, to control the supply of oil to the burner 5. In practice, however, it is found that the fluctuations in the gas supply are too rapid and too large and also that the resultant steam-pressure variations occur after so long a time-lag after a change in the gas firing rate that is impossible to obtain a stable control in this manner.

According to the invention the weighted sum of the amounts of gas and fuel oil supplied to the furnace (viz., the total combustion valve of the two fuels) is now determined; this summation value is compared in a controller with the desired value of this sum and the controller governs the supply of oil to the burner 5 in accordance with the result of this comparison. In this manner a very rapid, stable control is obtained which will be explained in detail below.

The amount of gas supplied to burner 4 is controlled by a control valve 11 in the branch pipe 2' and measured by a measuring instrument 12 having a suitable connection to flow-sensitive element 12', such as an orifice plate, in the pipe 2'. The position of the control valve 11 is determined by a reset controller 13, which receives a signal indicative of the actual gas flow rate from the instrument 12 via a line 12" and a reset control signal from the controller 10 via a line 10' (indicating the desired gas flow rate), and emits a pneumatic control signal to the valve via a line 13'.

The amount of oil supplied to burner 5 is controlled by a control valve 14 and measured by a measuring instrument 15 having a suitable connection to a flow-sensitive element 15', such as an orifice plate, in the pipe 3. The position of the control valve is determined by a reset controller 16, which receives a signal indicative of the actual oil flow rate from the instrument 15 via a line 15″ and a reset signal via a line 22′ (indicating the desired oil flow rate), and emits a pneumatic control signal to the valve via a line 16′.

The steam pressure is measured by a measuring instrument 17 (which also acts as a controller), having a connection to a pressure-sensitive element 17a in the pipe 9 or in direct communication therewith.

The amount of compressed air supplied to the air box 7 is measured in any suitable way, as by a measuring instrument 19 which measures the pressure difference between the air box and the hearth of the furnace, to which it is connected by lines 19a and 19b, respectively. A reset controller 20 which receives a signal indicative of the rate of air flow from the instrument 19 via a line 19′ and a reset signal via a line 24 emits a pneumatic control signal via a line 20′ to determine the position of the control valve 18.

The measuring instruments 12 and 15 each gives a pneumatic pressure signal via ducts $D_g$ and $D_f$, respectively, having a square relationship to the rates of gas and oil flow. They thus correspond to the meters $M_1$ and $M_2$ of the earlier embodiments and may include pneumatic relays as described for FIGURE 7. These ducts have resistance elements $R_g$ and $R_f$, respectively, and discharge into a common space G within an apparatus 21 according to the invention, e.g., of the type shown in FIGURE 6. The summation signal S of apparatus 21 is led via branched conduits 23 and 24 to a pressure controller 22 and to the previously mentioned controller 20.

The controller 22 receives the summation signal S via the duct 23, which indicates the actual total firing rate or rate of fuel value supplied to the furnace, and compares it with a set point value which can be set manually; however, the controller 22 may receive a set-point signal via line 17′ from the pressure-measuring instrument 17. The output of the controller 22 is transmitted via a line 22′ to the controller 16 to determine the set point thereof. The signal in the line 22′ is increased when the summation signal S exceeds the set point and vice versa. These functions will be described in greater detail.

In the first place the operation of the separate circuits 11–12–13, 14–15–16 and 18–19–20 will be discussed, and then the manner in which the combination 17–21–22 affects these circuits.

The amount of gas passing the line 2′ per unit of time is measured by the instrument 12, e.g., by an orifice plate 12′. This instrument gives a pneumatic pressure signal to the controller 13, where it is compared with the value which this signal should have (at that moment), viz., with the set point value of the controller 13, as determined by the controller 10. Should the signal of 12 actually correspond to this set point value, the controller 13 leaves the control valve 11 in the position it occupies; otherwise 13 emits a signal (e.g., varies the pressure in the line 13′) such that the valve 11 is opened further or closed further according as the stream in the pipe 2′ is smaller or greater than the desired value (this being the value to which the controller 13 is set at the moment). This set point value is not usually, however, a constant value, but is determined by 10 in accordance with the pressure in the main pipe 2 of the gas-supply system. If this pressure increases the set point value of 13 also increases; if this pressure decreases the signal derived from 10 also changes the set point value of 13 in such as way that this set point value is reduced.

In a similar manner the amount of fuel oil supplied per unit of time through the pipe 3 to the burner 5 is controlled by the combination 14–15–16, and the set point value of the controller 16 is determined by the signal derived from controller 22.

The pressure difference measured by the meter 19 results in a signal to the controller 20; the pressure difference measured is compared in this controller with the desired difference in pressure (set point value of controller 20) which is determined by the firing rate, i.e., the signal S representing the sum of the fuel flows. According as the measured pressure difference measured is higher or lower than this set point value the control valve 18 is closed or opened further. The set point value of 20 is increased as the signal S increases, and is reduced as this signal decreases. If the furnace is always under a constant load, all that is required is a correction, which may sometimes be omitted, since the control system ensures that S remains as constant as possible. In the case of a furnace under a variable load, in which S varies with the load, it is, however, desirable to control the air supply in the manner indicated.

The entities measured by the instruments 15 and 12 are now summed in the apparatus 21 in the manner previously described; the summation is, however, weighted in such a way that the combustion values of the fuels are actually summed, viz. the amounts of $K_g$ calories supplied through the pipes 2′ and 3 per unit of time.

To this end it is necessary to assume average values for the specific combustion values of the gas and the fuel oil and assign $k$-values as noted earlier in connection with Equations 7 and 8. The summation output signal S of apparatus 21 then represents the combustion value of the total amount of fuel entering the furnace 1. This signal is compared in the controller 22 with the set point value thereof, viz. the total combustion value which is required for normal operation of the furnace 1 and which to this end is set manually or by the controller 17.

If the actual value of the signal S is greater than that corresponding to the set point value, the controller 22 gives a signal by means of which the set point value of 16 is decreased; if the signal S is too small the set point value of 16 is increased. In the first case the valve 14 is closed further and in the second case it is opened further in such a way that the sum signal S ultimately reaches the desired set point value. The result of the control outlined hitherto therefore results in S assuming a constant value. A further correction can, however, be applied to this control by the pressure controller 17. If the controller 17 measures a steam pressure which departs from the value set to this instrument, a signal is produced which affects the set point value of the controller 22. When the steam pressure measured is too low, the set point value of 22 is increased, and vice versa. In this way the instrument 17 makes a correction in any differences occurring in the specific combustion values of gas and oil, and on the other hand a correction which relates to variations in the load on the furnace.

In conclusion it should be observed that provisions not further specified are made in the control which prevents the oil burner from being underloaded. This is done by applying a limit to the possibility of reducing the set point value of the controller 16 (via line 22′), as well as a limit to the possibility of increasing the set point value of the controller 13 (via the line 10′).

In the manner outlined above it is possible to burn in a furnace a fuel (in this case gas) of which the available amount is subject to great fluctuations. For the sake of completeness it should be observed that it is not necessary that all signals occurring in the control system should be pneumatic ones; thus for instance the pressure-measuring instrument 17 may be made to affect electrically the set point value of controller 22.

The invention can be applied in a similar manner when the furnace is fired with more than two fuels (fuels derived from more than two different sources).

If the furnace is used for heating (or evaporating) media, such as oil, a temperature meter (which is also a controller) will generally be used at 17.

I claim as my invention:

1. The method of summing a plurality of additive entities of which the magnitudes are given at separate signal sources in the forms of such pneumatic pressure signals that there is a substantially square relationship between each entity and the corresponding signal pressure, which comprises the steps of maintaining a confined space, flowing a separate gas stream between each said source and said space by the difference in pressure between the said space and the respective pressure signal through a separate resistance having a substantially square resistance characteristic, flowing a composite gas stream between said space and a point external thereto such as to maintain the said space at a substantially constant pressure, and measuring the flow rate of the said composite stream as a measure of the sum of the said entities.

2. A summing method as defined in claim 1 wherein said space is maintained at a constant pressure by flowing said composite stream without appreciable resistance.

3. The method according to claim 2 wherein said space is maintained at substantially atmospheric pressure.

4. A summing method as defined in claim 1 wherein said space is maintained at superatmospheric pressure, the said composite stream is controlled by a flow-regulating element and passed through a resistance having a substantially square resistance characteristic and situated between the said flow-regulating element and the said space, whereby the pressure of said composite stream between the flow-regulating element and said last-mentioned resistance is determined by the flow rate of said composite stream, and the last-mentioned pressure is used as a measure of the sum of the said entities.

5. The method of summing a plurality of additive entities the magnitude of at least one of which is given at a signal source in the form of a pneumatic pressure signal such that there is a substantially square relationship between the said entity and the corresponding pressure signal the magnitude of at least one other entity being given at a signal source in the form of a pneumatic pressure signal having a substantially linear relation to the said other entity, which comprises the steps of maintaining a confined space, flowing a separate gas stream between each said source and said space by the difference in pressure between the said space and the respective pressure through a separate resistance, the resistance for the gas streams of signal sources giving signals of the first-mentioned form having a substantially square resistance characteristic and the resistance for the gas streams of signal sources giving signals of the second-mentioned form having a substantially linear resistance characteristic, flowing a composite gas stream between said space and a point external thereto such as to maintain the said space at a substantially constant pressure, and measuring the flow rate of the said composite stream as a measure of the sum of said entities.

6. The method of summing a plurality of additive entities associated with separate streams of fluent material which comprises the steps of measuring the flow rates of said streams, transforming said stream measurements at separate signal sources into corresponding pneumatic pressure signals such that there is a substantially square relationship between each said entity and the corresponding signal pressure, maintaining a confined space, flowing a separate gas stream from each said signal source into said space by the difference in pressure between the said space and the respective pressure signal through a separate resistance having a substantially square resistance characteristic, discharging a composite gas stream from said space such as to maintain the said space at a substantially constant pressure, and measuring the flow rate of the said composite stream as a measure of the sum of said entities.

7. The method as defined in claim 6 wherein the steps of transforming the stream measurements comprises the steps of first transforming the measurements into corresponding first pneumatic pressure signals having specified square relationships to the corresponding entities, and amplifying each of the said first signals to produce a corresponding second pneumatic pressure signal having a linear relationship to the first signal, the said second pressure signals being applied to the said resistances for the flow of gas into said space.

8. The method as defined in claim 6 wherein said space is maintained at substantially atmospheric pressure and the composite gas stream is vented therefrom to the atmosphere.

9. The method as defined in claim 6 wherein said space is maintained at superatomspheric pressure, the said composite stream is discharged therefrom by passage first through a resistance having a substantially square resistance characteristic and thereafter through a flow-control element, the pressure within the said space being maintained constant by controlling the said flow-control element in accordance with the pressure within the said space, whereby the pressure of said composite stream after flow through said resistance and before flow through said flow-control element is determined by its flow rate, and the last-mentioned pressure is used as a measure of the sum of the said entities.

10. Method of controlling the flow of fluent fuel to a furnace having a plurality of burners wherein different fuels are fired which comprises the steps of flowing said fuels through separate pipes to corresponding burners in the furnace, measuring the rates of flow of said fuels through said pipes, transforming the fuel flow measurements at separate signal sources into corresponding pneumatic pressure signals such that there is a substantially square relationship between each fuel flow and the corresponding signal pressure, maintaining a confined space, flowing a separate gas stream from each said signal source into said space by difference in pressure between the said space and the respective pressure signal through a separate resistance having a substantially square resistance characteristic, discharging a composite gas stream from said space such as to maintain the said space at a substantially constant pressure, measuring the flow rate of said composite stream, varying the flow rate of one of said fuels, and controlling the flow rate of the other of said fuels in accordance with the measured flow rate of said composite gas stream.

11. Apparatus for summing a plurality of additive entities, comprising separate means for producing pneumatic pressure signals such that there is a substantially square relationship between each entity and its corresponding pressure signal, a closed vessel, a separate duct for each said means connected for the flow of gas from the corresponding signal-producing means into the vessel at a rate determined by the pressure difference between said vessel and the corresponding pressure signal, a flow-resistance element having a substantially square resistance characteristic in each of said ducts, means for discharging a composite gas stream from said vessel and maintaining the vessel at a substantially constant pressure, and means for measuring the flow rate of said composite gas stream.

12. Apparatus according to claim 11 wherein said means for discharging the composite gas stream is a large passageway open to the atmosphere, whereby said vessel is at substantially atmospheric pressure.

13. Apparatus according to claim 11 wherein said means for discharging the composite gas stream includes a discharge duct connected to said vessel and having a flow-control valve, a flow-resistance element in said discharge duct between the said vessel and the said valve, means responsive to the pressure within said vessel for operating the said valve to maintain a substantially constant pressure within the vessel, and the said means for measuring the flow-rate of the composite stream comprises means for measuring the pressure in said discharge duct between the resistance element and the valve.

14. Apparatus according to claim 13 wherein the said vessel includes a pressure-responsive movable partition to divide the vessel into two compartments, the said separate ducts being connected to discharge gas into one of said compartments and the said discharge duct being connected to discharge gas from the same compartment, means for admitting gas at a controlled pressure to the other of said compartments, and means responsive to the movement of said movable partition for actuating the said valve.

15. Apparatus for controlling the flow of fuel to a furnace having a plurality of burners wherein different fuels are fire which comprises: a plurality of fuel pipes for supplying said fuels to the burners; means for measuring the flow rates of said fuels through said pipes and generating corresponding pneumatic pressure signals such that each measured fuel flow rate has a substantially square relationship to the corresponding signal pressure; a vessel; a separate duct for each said signal-generating means interconnecting the same with said vessel; a flow-resistance element in each said duct, said flow resistance element having a substantially square resistance characteristic; means for discharging gas from said vessel and maintaining the vessel at a substantially constant pressure; a flow control valve for at least one of said fuel pipes for controlling the rate of flow of one fuel to the burner; a valve actuator for said flow control valve; means for measuring the rate of gas discharge from said vessel; and means responsive to the measured rate of gas discharge for actuating said flow control valve.

16. Apparatus according to claim 15 wherein said last-mentioned means is a controller arranged to actuate said flow control valve to move the same toward closed position when the measured gas discharged rate rises and toward open position when the measured gas discharge rate falls.

References Cited in the file of this patent
UNITED STATES PATENTS
2,418,388   Ziebolz _____ Apr. 1, 1947